United States Patent [19]
Philbrook et al.

[11] 3,886,198
[45] May 27, 1975

[54] PROCESS FOR PREPARING IMINODIACETONITRILE

[75] Inventors: James E. Philbrook, Nashua; Jon C. Thunberg, Amerst, both of N.H.

[73] Assignee: W. R. Grace & Co., New York, N.Y.

[22] Filed: Dec. 13, 1973

[21] Appl. No.: 424,445

[52] U.S. Cl............................................ 260/465.5 A
[51] Int. Cl.................... C07c 121/42; C07c 121/02
[58] Field of Search............................... 260/465.5 A

[56] References Cited
UNITED STATES PATENTS
2,511,487  6/1950  Thompson................... 260/465.5 A
3,167,580  1/1965  Saunders et al............. 260/465.5 A
3,412,137  11/1968  Stutts........................... 260/465.5 A Primary Examiner—Joseph P. Brust
Attorney, Agent, or Firm—Elton Fisher; Kenneth E. Prince

[57] ABSTRACT

Iminodiacetonitrile is prepared by forming an aqueous mixture of hexamethylenetetramine, HCN, and sulfuric acid or other strong acid and continuously passing the mixture through a tubular reactor at about 50°–120°C to form iminodiacetonitrile which is recovered.

8 Claims, No Drawings

PROCESS FOR PREPARING IMINODIACETONITRILE

BACKGROUND OF THE INVENTION

This invention is in the field of iminodiacetonitrile (IDAN) preparation.

More particularly this invention is directed to the continuous preparation of IDAN by continuously passing an aqueous mixture of hexamethylenetetramine (HMTA), HCN, and $H_2SO_4$ or other strong acid through a tubular reactor (reaction zone) maintained at about 50°–120°C and recovering the IDAN which is formed.

Prior art processes for preparing IDAN are taught by the following U.S. Patents:

| Patent No. | Inventor(s) | Class |
|---|---|---|
| 2,442,547 | Mostek | 260/464 |
| 2,511,487 | Thompson | 260/465.5 |
| 2,794,044 | Miller | 260/465.5 |
| 3,167,580 | Saunders et al | 260/465.5 |
| 3,412,137 | Stutts | 260/465.5 |

Tubular reactors are well known to those skilled in the art. Their use is described in Canadian Pat. No. 829,333 (Davis et al., 260/464.8) and in the following U.S. Patents:

| Patent No. | Inventors | Class |
|---|---|---|
| 3,167,580 | Saunders et al | 260/465.5 |
| 3,463,805 | Morgan et al | 260/465.5 |
| 3,515,742 | Morgan et al | 260/465.5 |
| 3,607,930 | Berding et al | 260/534E |

SUMMARY OF THE INVENTION

In summary, this invention is directed to a process for preparing IDAN comprising preparing an aqueous system which is an aqueous mixture of HMTA, HCN, and sulfuric acid or another strong acid (preferably a strong mineral acid), said mixture having an acidic pH and mole ratio of HMTA to HCN of 1:5–7, passing the aqueous mixture through a tubular reaction zone (tubular reactor) while maintaining the temperature within the reaction zone at 50°–120°C, and recovering the IDAN from the aqueous mixture exit the reaction zone.

DESCRIPTION OF PREFERRED EMBODIMENTS

In preferred embodiments of the invention described in the above Summary:

1. The aqueous system (aqueous mixture of) HMTA, HCN, and strong acid having an acidic pH is prepared in a mixing zone while maintaining the temperature within the mixing zone at 0°–30°C (more preferably at 5°–20°C).
2. The temperature within the tubular reaction zone is 50°–120°C.
3. The temperature of the aqueous system exit the tubular reaction zone is cooled to 0°–40°C (more preferably 15°–25°C) and the IDAN is separated therefrom and recovered.
4. The mole ratio of HMTA to HCN is 1:5–7.
5. The pH of the aqueous system before passing through the tubular reaction zone is 2–6.9 (more preferably 3–5).
6. Residence time in the tubular reaction zone is 0.5–20 minutes (more preferably 5–10 minutes — preferably at a reaction temperature of 60°C).
7. The strong acid is a strong mineral acid.
8. The strong acid is a strong organic acid (e.g., glycerophosphoric acid).
9. The strong acid is sulfuric acid, nitric acid, hydrochloric acid phosphoric acid or pyrophosphoric acid.
10. The strong acid is sulfuric acid.

DETAILED DESCRIPTION OF THE INVENTION

The following equation shows the stoichiometry of the formation of IDAN from HMTA in the presence of sulfuric acid:

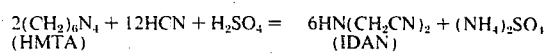

$$2(CH_2)_6N_4 + 12HCN + H_2SO_4 = 6HN(CH_2CN)_2 + (NH_4)_2SO_4$$
$$(HMTA) \qquad\qquad\qquad\qquad (IDAN)$$

The process (or method) of the instant invention offers a convenient method for the continuous preparation of IDAN from HMTA and HCN.

The aqueous system (an aqueous mixture of HMTA, HCN, and sulfuric acid or other strong acid) which is reacted to form IDAN can be prepared in a mixing zone (as recited in Embodiment 1, under the heading Description of Preferred Embodiments, supra) and passed from the mixing zone to (and through) the tubular reaction zone. If desired, two mixing zones can be used. In an operation using two mixing zones the aqueous system can be prepared in one (a first mixing zone) while feeding a previously prepared aqueous system from another (a second mixing zone) to and through the tubular reaction zone. When the second mixing zone becomes empty (or nearly empty), it can be replaced with the filled first mixing zone from which the aqueous system contained therein can be fed to (and through) the tubular reaction zone while preparing another lot of the aqueous system in the now empty (or nearly empty) second mixing zone. By feeding from one mixing zone while charging (preparing a new lot of the aqueous system) in the other, continuous runs of long duration can be made without interrupting feed of the aqueous system to the tubular reaction zone.

In an alternative procedure, an aqueous HMTA solution, liquid HCN (or an aqueous HCN solution) and strong acid can be continuously metered into the tubular reactor at rates to provide the reactants (HMTA, HCN, and strong acid) in amounts to provide; (a) the appropriate pH; (b) the appropriate mole ratios; and (c) the desired residence time in the tubular reactor. In other words, the aqueous system (aqueous mixture comprising water, HMTA, HCN, and strong acid) is continuously formed in situ (in the tubular reactor).

Conveniently, the tubular reactor can be surrounded by a heat exchange medium (e.g., oil, Dowtherm, chlorinated hydrocarbons, or the like) maintained at a predetermined temperature. Alternatively, electrical heating can be used to maintain a predetermined temperature within the tubular reaction zone. Still other temperatures control methods will be readily apparent to those skilled in the art.

The temperature of the aqueous system in the mixing zone can be controlled via cooling coils in the mixing zone or via a cooling jacket surrounding said zone. Other methods for maintaining the desired temperature within said zone will be readily apparent to those skilled in the art.

The aqueous system exit the tubular reaction zone can be cooled by passing it (the aqueous system) through a heat exchanger or by placing it in a tank or vessel provided with cooling coils or a cooling jacket.

Said table shows reaction temperature, residence time, mole ratios of reactants, pH of cooled product (aqueous system) exit the reaction zone, and conversion (as percent of theory) for each run.

IDAN PREPARATION

| Run No. | Temperature °C | Residence Time, Minutes | Mole Ratio, HMTA:HCN:$H_2SO_4$ | pH of Cooled Product | Conversion % of Theory |
|---|---|---|---|---|---|
| 1 | 60 | 5 | 2:12:1 | 6.8 | 92.1 |
| 2 | 60 | 3.5 | 2:12:1.1 | 5.7 | 92.8 |
| 3 | 60 | 5 | 2:12:1.1 | — | 90.5 |
| 4 | 60 | 10 | 2:12:1.1 | 7.2 | 97 |
| 5 | 60 | 15 | 2:12:1.1 | 7.2 | 98.4 |
| 6 | 60 | 20 | 2:12:1.1 | 7.5 | 98.7 |
| 7 | 60 | 1 | 2:12:1.1 | 4.7 | 49.7 |
| 8 | 60 | 2.5 | 2:12:1.1 | 5.4 | 76.6 |
| 9 | 60 | 5 | 2:12:1.1 | 6.9 | 95.4 |
| 10 | 60 | 7.5 | 2:12:1.1 | 7.1 | 97.4 |
| 11 | 60 | 10 | 2:12:1.1 | 7.4 | 99 |
| 12 | 60 | 5 | 2:12:1.2 | 6.5 | 92.9 |
| 13 | 60 | 7.5 | 2:12:1.2 | 6.8 | 95.9 |
| 14 | 60 | 10 | 2:12:1.2 | 7.1 | 97.4 |
| 15 | 80 | 1 | 2:12:1.2 | 7.2 | 95 |
| 16 | 80 | 2.5 | 2:12:1.2 | 7.9 | 98.3 |
| 17 | 80 | 5 | 2:12:1.2 | 8+ | 100 |

Other methods for cooling said aqueous system will be readily apparent to those skilled in the art.

The IDAN product, which is a solid, can be separated from the cooled aqueous mixture (aqueous system) exit the tubular reactor by centrifugation, decantation, or filtration.

Where operating a temperatures (in the tubular reactor) above about 100°C pressure in excess of atmospheric (760 Torr) is maintained on the mixture (aqueous system) in the reaction zone to prevent excessive vaporization in the tubular reactor.

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE 1

An aqueous system or mixture was formed by admixing at about 10°C in a mixing zone 1 mole of HMTA, 6 moles of liquid anhydrous HCN, and 0.5 mole of concentrated sulfuric acid. The HMTA was fed into the mixing zone as an aqueous solution analyzing 30% HMTA. The resulting mixture, which had a pH of about 4 at 10°C, was maintained at about 10°C while in the mixing zone. Said mixture was pumped through a ⅛ inch stainless steel tube (a tubular reaction zone) having a length of 3 meters. The tube was immersed in an oil bath having a temperature of 60°C which served as a heat exchange medium. Residence time in the tubular reactor (reaction zone) was 3.5 minutes. The product (an aqueous mixture) exit the tubular reactor was cooled to 20°C, and solid IDAN which was present in the cooled aqueous system was separated by filtration, recovered, air dried, weighed, and analyzed. Product purity was 87% and conversion (one pass yield) was 73.7% of theory. The pH of the cooled product exit the reaction zone was 6.5.

EXAMPLE 2

Each of the runs reported in the following table was conducted using the general procedure of Example 1.

EXAMPLE 3

An aqueous system or mixture was formed by admixing at about 10°C in a mixing zone 1 mole of HMTA, 6 moles of liquid anhydrous HCN, and 0.2 mole of concentrated sulfuric acid. The HMTA was fed into the mixing zone as an aqueous solution analyzing 30% HMTA. The resulting mixture or aqueous system was maintained at about 10°C while in the mixing zone. Said aqueous system was pumped through a ⅛ inch stainless tube (a tubular reaction zone) having a length of 3 meters. Said tubular reaction zone had a principal inlet port at one end (the inlet end) and an exit port at the other end (the exit end). Five minor inlet ports were positioned along the tubular reaction zone (tubular reactor) as follows:

| Minor Inlet Port | Distance from Principal Inlet Port, Meters |
|---|---|
| First | 0.5 |
| Second | 1 |
| Third | 1.5 |
| Fourth | 2 |
| Fifth | 2.5 |

The tubular reactor was immersed in an oil bath having a temperature of 60°C which served as a heat exchange medium. Residence time in the tubular reactor (reaction zone) was 3.5 minutes. While passing the aqueous system through the tubular reaction zone 0.3 mole of concentrated sulfuric acid was fed at a constant rate into the reaction zone via the aforesaid 5 minor inlet ports. 0.06 mole of the sulfuric acid was added through each of said minor ports. The product (an aqueous mixture) exit the tubular reaction zone was cooled to 20°C, and solid IDAN which was present in the cooled aqueous mixture was separated by filtration, recovered, are dried, weighed, and analyzed. Product purity was 87% and conversion (one pass yield) was 74% of theory. The pH of the cooled product exit the reaction zone was 6.5.

EXAMPLE 4

The general procedure of Example 1 was repeated;

however, in this instance the procedure was modified by replacing the sulfuric acid with hydrochloric acid using a 20% solution of HCl in water.

The results were indistinguishable from those of Example 1.

EXAMPLE 5

The general procedure of Example 1 was repeated; however, in this instance the procedure was modified by replacing the sulfuric acid with nitric acid using an aqueous solution analyzing 35% $HNO_3$.

The results were indistinguishable from those of Example 1.

EXAMPLE 6

The general procedure of Example 1 was repeated; however, in this instance the procedure was modified by replacing the sulfuric acid with phosphorous acid using an aqueous solution analyzing 90% $N_3PO_4$.

The results were indistinguishable from those of Example 1.

IDAN is an intermediate on a route to iminodiacetic acid (IDA) which can be prepared from IDAN by a method taught by Eschweiler (Ann. 1894, 278, 229–239). IDA is used in metal plating baths. German Pat. No. 1,034,946 (Chem. Abstracts 1960, 54, 16237e) teaches the use of IDA in cyanidecontaining copper (and copper alloy) plating baths. The presence of IDA in such baths causes copper (or the copper alloy) to plate (precipitate) as a bright coating.

The use of IDA in the preservation of rubber latex is taught by British Pat. No. 800,089 (Chem. Abstracts 1959, 53, 2672i).

When heated in an aqueous medium with about a stoichiometric quantity sodium hydroxide solution IDAN yields disodium iminodiacetate ($IDANa_2$) according to the following equation:

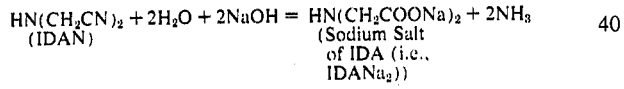

French Pat. No. 1,190,714 (Chem. Abstracts 1960, 54, 25993g) teaches the use of $IDANa_2$ as an agent for removing residual catalyst (e.g., Ti, Cr, Fe, V, or Al salts) from polyolefins.

As used herein the term "percent (%)" means parts per hundred and "parts" means parts by weight unless otherwise defined where used.

As used herein the term "mole" has its generally accepted meaning, i.e., a mole of a substance is that quantity which contains the same number of molecules of the substance as there are atoms in 12 grams of pure $^{12}C$.

As used herein the term "g" means gram or grams.
"IDA" means iminodiacetic acid.
"IDAN" means iminodiacetonitrile.
"$IDANa_2$" means disodium iminodiacetate.
"NTAN" means nitrolotriacetonitrile.

The term "Torr" means mm of mercury pressure; thus 1 atmosphere is 760 Torr.

"Percent conversion" and "percent yield" are dimensionless numbers.

"HMTA" means hexamethylenetetramine.

We claim:

1. A process for preparing iminodiacetonitrile comprising preparing an aqueous mixture of hexamethylenetetramine HCN, and a strong acid selected from the group consisting of sulfuric acid, hydrochloric acid, and nitric acid, the aqueous mixture having a pH of 3–5 and a mole ratio of hexamethylenetetramine to HCN of 1:5–7, passing the aqueous mixture through a tubular reaction zone while maintaining the temperature within the reaction zone at 50°–120°C, residence time in the reaction zone being 0.5–20 minutes, and recovering the iminodiacetonitrile.

2. The process of claim 1 in which the strong acid is sulfuric acid.

3. A continuous process for preparing iminodiacetonitrile comprising continuously:

a. forming an aqueous system haivng a pH of 3–5 by admixing water, hexamethylenetetramine, HCN, and a strong acid selected from the group consisting of sulfuric acid, hydrochloric acid, and nitric acid in a mixing zone while maintaining the temperature within the mixing zone at 0°–30°C, the mole ratio of hexamethylenetetramine to HCN being 1:5–7;

b. passing the aqueous system through a tubular reaction zone while maintaining the temperature within the reaction zone at 50°–120°C to form the iminodiacetonitrile in the aqueous system, residence time within the reaction zone being 0.5–20 minutes;

c. cooling the aqueous system exit the tubular reaction zone to 0°–40°C, and separating and recovering the iminodiacetonitrile.

4. The process of claim 3 in which the temperature within the mixing zone is maintained at 5°–20°C.

5. The process of claim 3 in which the mole ratio of hexamethylenetetramine to HCN is 1:5.5–6.5.

6. The process of claim 3 in which the temperature within the tubular reaction zone is 60°–70°C.

7. The process of claim 3 in which the residence time within the tubular reaction zone is 5–10 minutes.

8. The process of claim 3 in which the strong acid is sulfuric acid.

* * * * *